United States Patent
Yang et al.

(10) Patent No.: US 8,509,352 B2
(45) Date of Patent: Aug. 13, 2013

(54) INTEGER SPREADING ROTATION MATRICES FOR QAM CONSTELLATIONS AND ITS DECODE-REMODULATE-FORWARD COOPERATIVE COMMUNICATION STRATEGY

(75) Inventors: Jun Yang, Croton-On-Hudson, NY (US); Monisha Ghosh, Chappaqua, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1346 days.

(21) Appl. No.: 12/096,975

(22) PCT Filed: Dec. 8, 2006

(86) PCT No.: PCT/IB2006/054720
§ 371 (c)(1),
(2), (4) Date: Jun. 11, 2008

(87) PCT Pub. No.: WO2007/069172
PCT Pub. Date: Jun. 21, 2007

(65) Prior Publication Data
US 2008/0317168 A1    Dec. 25, 2008

Related U.S. Application Data

(60) Provisional application No. 60/749,433, filed on Dec. 12, 2005.

(51) Int. Cl.
*H03K 9/00*    (2006.01)

(52) U.S. Cl.
USPC ........... 375/316; 375/260; 375/267; 375/299; 375/347; 455/101

(58) Field of Classification Search
None
See application file for complete search history.

(56) References Cited

U.S. PATENT DOCUMENTS

| | | | |
|---|---|---|---|
| 7,263,133 B1 * | 8/2007 | Miao | 375/267 |
| 7,688,902 B1 * | 3/2010 | Lou et al. | 375/260 |
| 7,715,805 B2 * | 5/2010 | Gresset et al. | 455/101 |
| 2006/0056550 A1 * | 3/2006 | Skraparlis et al. | 375/347 |

* cited by examiner

*Primary Examiner* — Adolf Dsouza
(74) *Attorney, Agent, or Firm* — Larry Liberchuk (57) ABSTRACT

Diversity techniques are commonly used in wireless communications to combat multipath fading. Recent interests in ultra-wideband technology focus on multi-band OFDM systems that can explore the high diversity due to the independent frequency bands. To achieve full diversity with high data rate, a system, apparatus and method that uses coded modulation with spreading rotation of transmitted signals. A 2×2 integer rotation matrix for QAM signals, 3×3 and 4×4 integer rotation matrices for QAM signals are provided. Compared with the non-regular QAM shape for real rotation matrices, each of these integer rotation matrices makes the regular QAM shape after rotation.

24 Claims, 7 Drawing Sheets

INTEGER SPREADING ROTATION MATRICES FOR QAM CONSTELLATIONS AND ITS DECODE-REMODULATE-FORWARD COOPERATIVE COMMUNICATION STRATEGY

The present invention relates to a system, apparatus, and method for increasing diversity of QAM communications by using specially derived spreading rotation matrices. An application of these spreading rotation matrices in a cooperative relaying scheme in which a relay node decodes-remodulates-forward (D-ReM-F) transmitted QAM signals achieves additional signal space diversity as well as cooperative diversity from distributed users.

Diversity is commonly used in wireless communication systems to combat multi-path fading and improve the system performance. Recent interest in ultra-wideband technology has focused on multi-band OFDM systems that can exploit the high diversity resulting from multiple independent frequency bands. To achieve full diversity with high data rate, one technique that can be used is coded modulation with spreading rotation of transmitted signals, such as the dual-carrier modulation (DCM) proposed in the MBOA PHY specification for 4-QAM signals and rotated DFT spreading matrix. Further, many signal space diversity from lattice coding techniques have been also proposed in the literature.

While the DCM scheme can achieve diversity 2 for 4-QAM (QPSK) signals, its optimality, in the sense of maximizing the coding gain, has not been established. For rotated DFT matrices, the coding gain may not be maximized because the purpose of their design is to achieve full diversity. In addition, their complex structure also increases the decoding complexity for the receiver.

For 4-QAM signals, a method for designing an integer rotation matrix to achieve diversity 3 or 4 is still an open issue.

Cooperative strategies for wireless networks are drawing a lot of attention recently, because they can facilitate the communication between the nodes in the network without any fixed infrastructure. The so-called cooperative diversity is associated with the ability of users to share their antennas in a distributed way and achieve more diversity gain from different versions of a transmitted signal.

Figure 1:
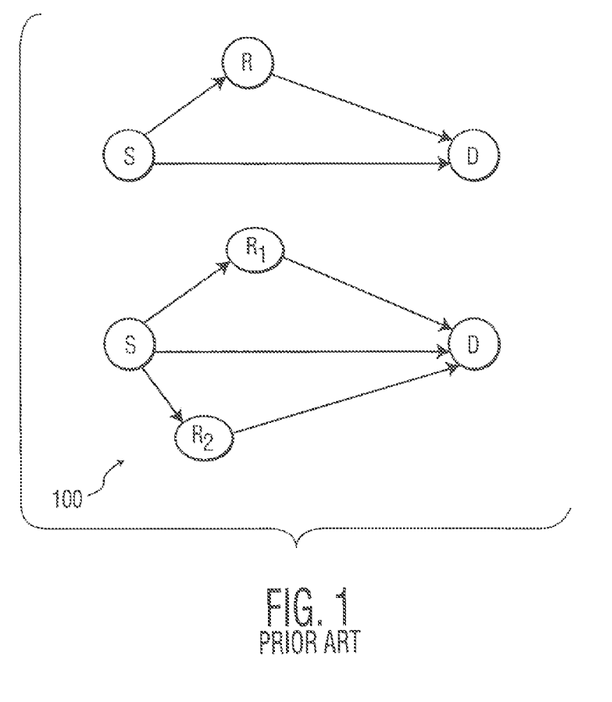
FIG. 1 illustrates a typical relay scenario.

A typical relay scenario, shown in FIG. 1, consists of a source node S, at least one relay node R, and a destination node D. Various practical schemes have been proposed to exploit the benefits of cooperation among nodes, which schemes are usually classified into two categories: amplifier-forward (AF) and decode-forward (DF). In AF mode, a relay node simply scales and retransmits a correctly received signal waveform received from a source. In DF mode, the correctly received signal from the source is demodulated and decoded before transmission. Due to the possibility of decoding error, DF can be switched to non-cooperative mode in the case of a failed cyclic redundancy check (CRC). AF requires low implementation complexity of digital signal processing at the relay node, and it can operate under all source-relay (S-R) channel conditions. However, AF also amplifies the noise power at the same time. When the quality of the S-R channel is good and the signal can be decoded correctly at the relay node, DF can achieve a higher gain and also give space to more complicated schemes, such as coded cooperation, in which the data are re-encoded at the relay to obtain a different set of parity bits.

Recently, several hybrid or mixed modes such as amplify-decode-forward or decode-amplify-forward have been proposed for better utilization of the gain from both modes. A way to take advantage of signal space diversity and applying it to cooperative communications is needed as a possibly better alternative to these resent proposals.

The system, apparatus and method of the present invention provide integer 2×2, 3×3, and 4×4 spreading rotation matrices to achieve more diversity in QAM communications. That is, in the first preferred embodiment, a 2×2, 3×3, 4×4 set of rotation matrices is provided from the point of view that it use of one of these constitutes a linear modulation scheme over several independent channels for a single source-destination communication. This linear modulation scheme achieves higher order diversity due to the joint decoding of the transmitted signal at the receiver.

An application of this technique to cooperative communications being motivated by the observation that in a wireless local or personal network, co-located devices have the same encoding or decoding processes, i.e., bit-interleaved coded modulation, and cooperation at the symbol level can be achieved by combining re-modulation using the spreading-rotation matrices technique with DF mode. Therefore, the signal space diversity is exploited to further improve the overall system performance in addition to the cooperative diversity provided by DF mode.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

To find 2×2 rotation matrix for QAM symbols, the basic system model is $$\begin{bmatrix} y_1 \\ y_2 \end{bmatrix} = \begin{bmatrix} h_1 & 0 \\ 0 & h_2 \end{bmatrix} \cdot \begin{bmatrix} \cos(\theta) & \sin(\theta) \\ \sin(\theta) & -\cos(\theta) \end{bmatrix} \begin{bmatrix} x_1 \\ x_2 \end{bmatrix} + \begin{bmatrix} n_1 \\ n_2 \end{bmatrix},$$

$$x_1, x_2 \in \{\pm 3 \pm 3i\}$$

which is then changed into $$\begin{bmatrix} y_1 \\ y_2 \end{bmatrix} = \begin{bmatrix} x_1\cos(\theta) + x_2\sin(\theta) & 0 \\ 0 & x_1\sin(\theta) - x_2\cos(\theta) \end{bmatrix} \begin{bmatrix} h_1 \\ h_2 \end{bmatrix} + \begin{bmatrix} n_1 \\ n_2 \end{bmatrix},$$

$$x_1, x_2 \in \{\pm 3 \pm 3i\}$$

Calculate $$\min_{\Delta x_1, \Delta x_2} |\Delta x_1 \cos(\theta) + \Delta x_2 \sin(\theta)|^2 \cdot |\Delta x_1 \sin(\theta) - \Delta x_2 \cos|^2$$

where $\Delta x_1 = x_1 - x'_1$, $\Delta x_2 = x_2 - x'_2$ for every angle theta and find the one which maximizes the coding gain.

To find 3×3 matrices for QAM symbols, the Euler rotation matrix is used as a template:

$$\begin{bmatrix} 1 & 0 & 0 \\ 0 & \cos(\alpha) & \sin(\alpha) \\ 0 & \sin(\alpha) & -\cos(\alpha) \end{bmatrix} \begin{bmatrix} \cos(\beta) & \sin(\beta) & 0 \\ \sin(\beta) & -\cos(\beta) & 0 \\ 0 & 0 & 1 \end{bmatrix} \begin{bmatrix} \cos(\theta) & 0 & \sin(\theta) \\ 0 & 1 & 0 \\ \sin(\theta) & 0 & -\cos(\theta) \end{bmatrix}$$

or the following circular matrix is used as a template $$\begin{bmatrix} a & b & -c \\ -c & a & b \\ b & -c & a \end{bmatrix} \text{ where } a^2 + b^2 + c^2 = 1.$$

To find 4×4 matrices for QAM symbols, the following real orthogonal matrix is used as a template:

$$\begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}.$$

Figure 2:
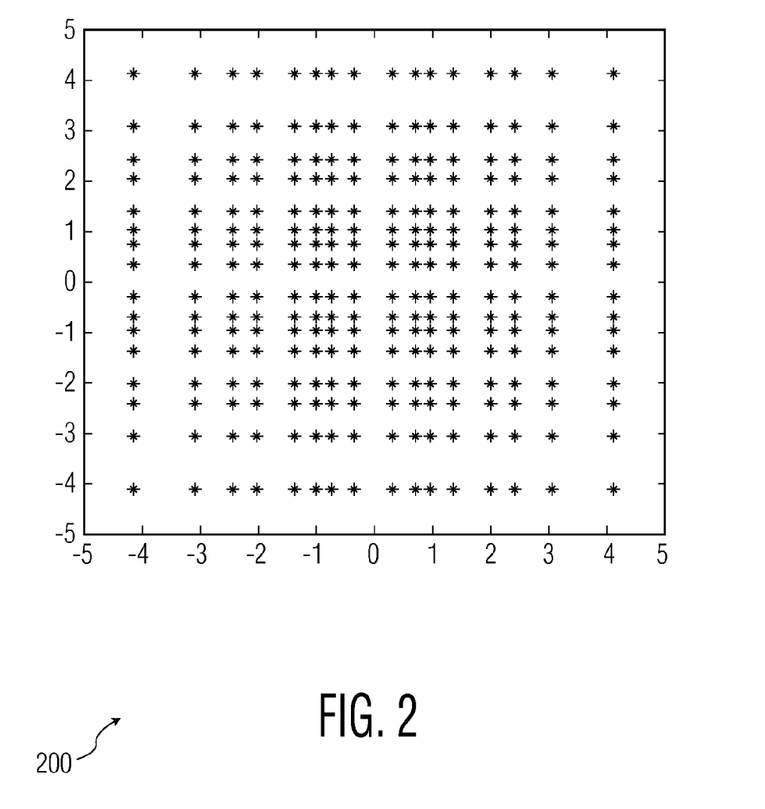
FIG. 2 illustrates spreading two 16-QAM symbols into non-uniform 256-QAM symbols.

The 2×2 real rotation matrix for two QAM symbols can be found as $$R_{16,2} = \begin{bmatrix} 0.8507 & 0.5257 \\ 0.5257 & -0.8507 \end{bmatrix}$$

For example, it can spread two 16-QAM symbols into non-uniform 256-QAM symbols as shown in FIG. 2.

In a first preferred embodiment, an integer spreading rotation matrix that can spread two 16-QAM symbols into regular 256-QAM symbols is obtained as $$I_{16,2} = \frac{1}{\sqrt{17}} \begin{bmatrix} 4 & 1 \\ 1 & -4 \end{bmatrix}.$$

Similarly, 2×2 integer spreading rotation matrices that can spread 64-QAM symbols and 256-QAM symbols are obtained respectively as $$I_{64,2} = \frac{1}{\sqrt{65}} \begin{bmatrix} 8 & 1 \\ 1 & -8 \end{bmatrix}, I_{256,2} = \frac{1}{\sqrt{257}} \begin{bmatrix} 16 & 1 \\ 1 & -16 \end{bmatrix}.$$

Figure 3:
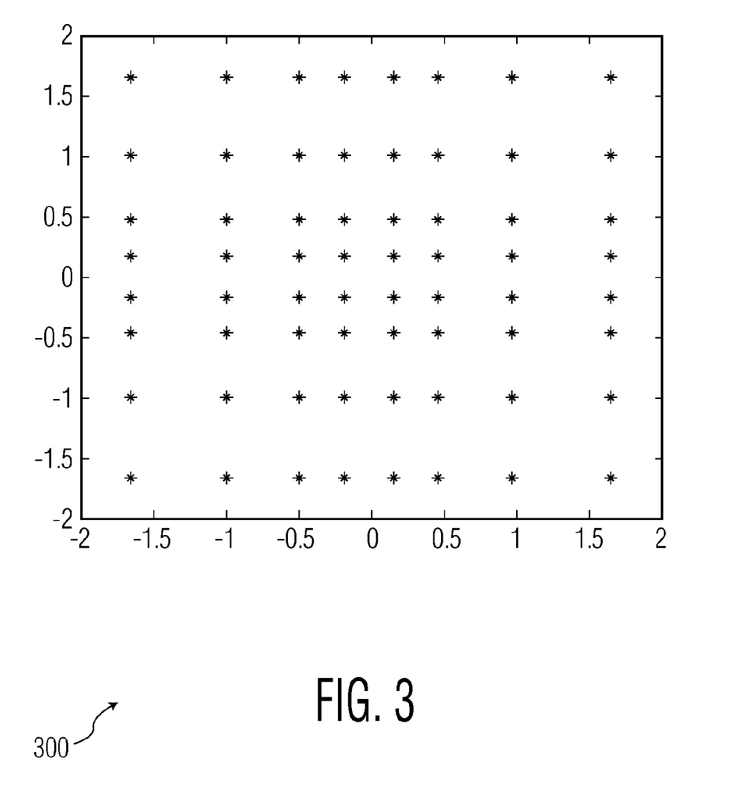
FIG. 3 illustrates spreading and rotating three 4-QAM symbols into non-uniform 64-QAM symbols.

The 3×3 real rotation matrix for three QAM symbols can be found as $$R_{4,3} = \begin{bmatrix} 0.5910 & 0.7370 & -0.3280 \\ -0.3280 & 0.5910 & 0.7370 \\ 0.7370 & -0.3280 & 0.5910 \end{bmatrix}$$

which spreads 4-QAM symbols into non-uniform 64-QAM symbol as shown in FIG. 3. In a first preferred embodiment, integer approximations are obtained from the real pattern of FIG. 3, which spread 4-QAM symbols into regular 64-QAM symbols:

$$I_{4,3} = \frac{1}{\sqrt{21}} \begin{bmatrix} 4 & 2 & -1 \\ -1 & 4 & 2 \\ 2 & -1 & 4 \end{bmatrix}, \frac{1}{\sqrt{21}} \begin{bmatrix} 4 & -2 & 1 \\ 1 & 4 & -2 \\ -2 & 1 & 4 \end{bmatrix}$$

Any permutation of the above two matrices between rows or columns is also a valid rotation matrix. Similarly, 3×3 integer spreading rotation matrices that can spread three 16-QAM symbols, three 64-QAM symbols and three 256-QAM symbols are obtained respectively as $$I_{16,3} = \frac{1}{\sqrt{273}} \begin{bmatrix} 16 & 4 & -1 \\ -1 & 16 & 4 \\ 4 & -1 & 16 \end{bmatrix}, \frac{1}{\sqrt{273}} \begin{bmatrix} 16 & -4 & 1 \\ 1 & 16 & -4 \\ -4 & 1 & 16 \end{bmatrix}$$

$$I_{64,3} = \frac{1}{\sqrt{4161}} \begin{bmatrix} 64 & 8 & -1 \\ -1 & 64 & 8 \\ 8 & -1 & 64 \end{bmatrix}, \frac{1}{\sqrt{4161}} \begin{bmatrix} 64 & -8 & 1 \\ 1 & 64 & -8 \\ -8 & 1 & 64 \end{bmatrix}$$

$$I_{256,3} = \frac{1}{\sqrt{65793}} \begin{bmatrix} 256 & 16 & -1 \\ -1 & 256 & 16 \\ 16 & -1 & 256 \end{bmatrix}, \frac{1}{\sqrt{65793}} \begin{bmatrix} 256 & -16 & 1 \\ 1 & 256 & -16 \\ -16 & 1 & 256 \end{bmatrix}$$

Any permutation of each above matrix between rows or columns is also a valid rotation matrix.

Figure 4:
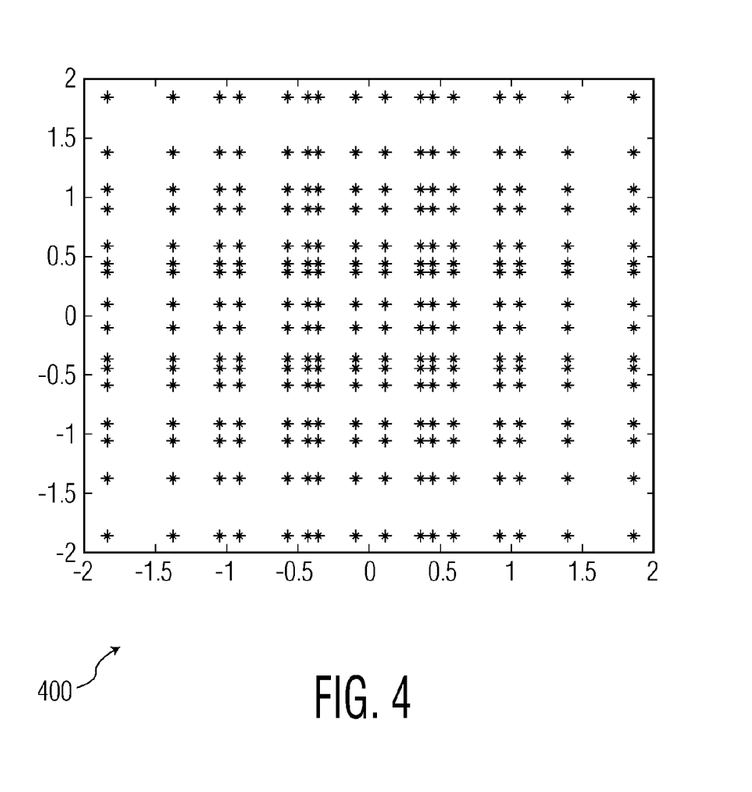
FIG. 4 illustrates spreading four 4-QAM symbols into non-uniform 256-QAM symbols.

The 4×4 real rotation matrix for QAM symbols can be found as $$R_{4,4} = \begin{bmatrix} 0.2334 & 0.7469 & 0.4752 & 0.4023 \\ -0.7469 & 0.2334 & -0.4023 & 0.4752 \\ -0.4752 & 0.4023 & 0.2334 & -0.7469 \\ -0.4023 & -0.4752 & 0.7469 & 0.2334 \end{bmatrix}$$

which spreads 4-QAM symbols into non-uniform 256-QAM symbols as illustrated in FIG. 4.

In a first preferred embodiment, all 4×4 integer rotation matrices for four QAM symbols are of the type:

$$I_{4,4} = \frac{1}{\sqrt{85}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm1, \pm2, \pm4, \pm8\}$ and their absolute value must be different from each other. For example, it can be $$I_{4,4} = \frac{1}{\sqrt{85}} \begin{bmatrix} 8 & 4 & 2 & 1 \\ -4 & 8 & -1 & 2 \\ -2 & 1 & 8 & -4 \\ -1 & -2 & 4 & 8 \end{bmatrix}$$

which spreads 4-QAM symbols into regular 256-QAM symbols. Similarly, 4×4 integer spreading rotation matrices that can spread four 16-QAM symbols, four 64-QAM symbols and four 256-QAM symbols are obtained respectively as follows:
all 4×4 integer rotation matrices for 16-QAM symbols are of the type:

$$I_{16,4} = \frac{1}{\sqrt{4369}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm1, \pm4, \pm16, \pm64\}$ and their absolute value must be different from each other.
all 4×4 integer rotation matrices for 64-QAM symbols are of the type:

$$I_{64,4} = \frac{1}{\sqrt{266305}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm1, \pm8, \pm64, \pm512\}$ and their absolute value must be different from each other.
all 4×4 integer rotation matrices for 256-QAM symbols are of the type:

$$I_{256,4} = \frac{1}{\sqrt{16843009}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm1, \pm16, \pm256, \pm4096\}$ and their absolute value must be different from each other.

Figure 5:
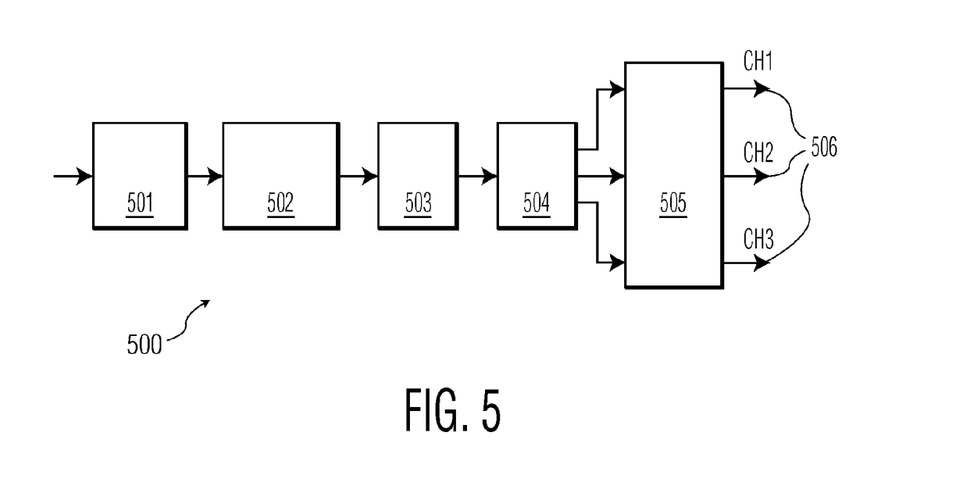
FIG. 5 illustrates a transmitter using a 3×3 spreading rotation matrix to transmit spread and rotated symbols over 3 sub-channels.
Figure 8:
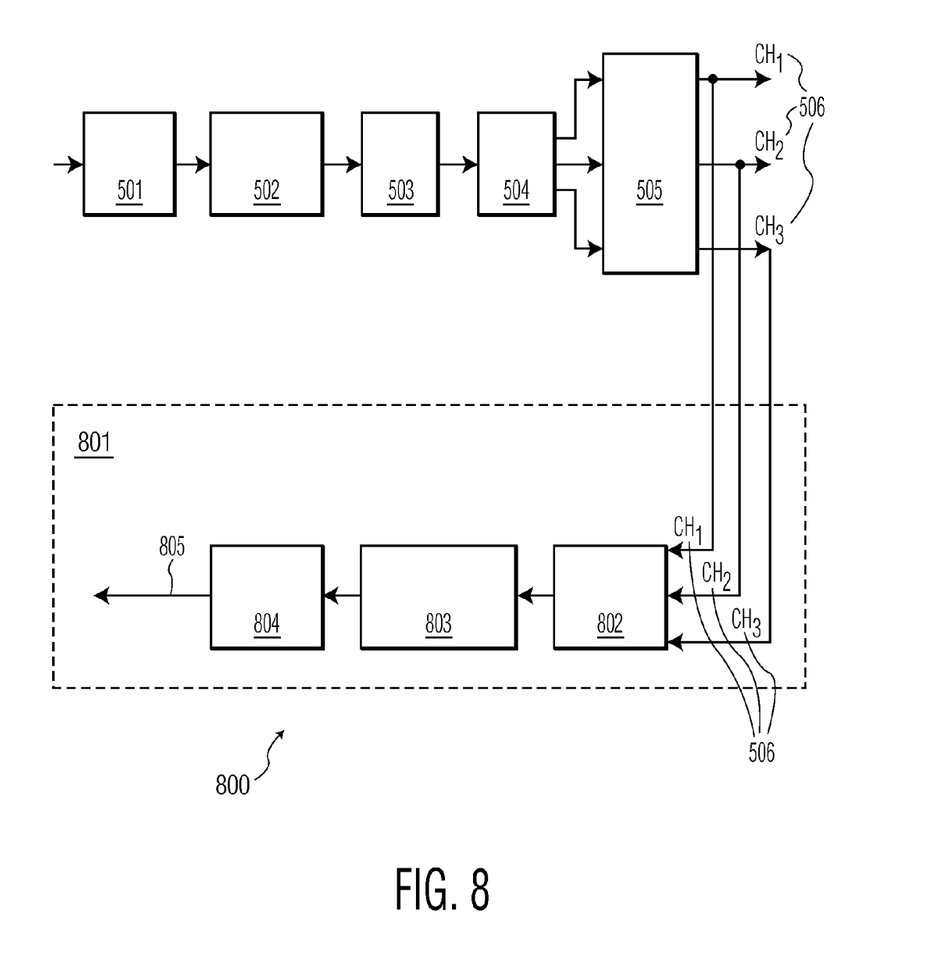
FIG. 8 illustrates a system including the transmitter of FIG. 5.

It needs to be mentioned that the performance difference of integer rotation matrices and real ones are very small, but the integer rotation matrix has much simpler computational complexity. To use these integer spreading rotation matrices, the input QAM symbols are multiplied with any of these matrices and then the output symbols from this multiplication are transmitted over different independent sub-channels. An example of a system 800 using a 3×3 rotation matrix and transmitting 500 and receiving 801 the rotated symbols over 3 independent sub-channels 506, is illustrated in FIG. 8. An example of a transmitter using a 3×3 rotation matrix is illustrated in FIG. 5 and includes a spreading and rotation component 505 for multiplying the symbols by the spreading rotation 3×3 matrix.

A first embodiment of the present invention provides 2×2, 3×3, and 4×4 integer spreading rotation matrices that allow a communication system using QAM modulation to achieve high diversity while maintaining the same rate at lower computational complexity. One of the immediate applications is the next generation (Gigabit) Multi-Band OFDM UWB systems. The application of integer spreading rotation matrices of this invention allows a 1 Gbps mode that has longer range compared to a prior art system. Further, the first embodiment makes the combination of spreading rotation techniques and MIMO transmission schemes possible to achieve higher diversity. That is, in the first preferred embodiment, a 2×2, 3×3, 4×4 set of integer rotation matrices is provided from the point of view that it is a linear modulation scheme over several independent channels for a single source-destination communication. This linear modulation scheme achieves higher order diversity due to the joint decoding of transmitted signals at the receiver.

However, if these integer spreading rotation matrices are considered as lattice codes, these spreading rotation matrices are equally applicable to a cooperative communication case, such as the single relay case illustrated in FIG. 1, or one having a plurality of relays. In a second preferred embodiment comprising a cooperative communication system, a spreading rotation 'mother' code is translated into a distributed modulation scheme wherein the source transmits the first component of rotated signals by multiplying the source signal using the first row of a rotation matrix obtained using the first embodiment. Then each relay receives and decodes the source's transmission and (if correct) remodulates the decoded signal by multiplying the decoded signal using another and pre-assigned row of the rotation matrix and forwards the remodulated signal (D-ReM-F). For example, assuming that the relay nodes are ordered by a 1-1 correspondence with the integers, relay 1 multiplies by row 2 and relay n multiplies by row n+1. The destination performs the joint decoding of all relayed signals. Because the link from each relay to the destination is independent of all others, the destination still enjoys the same diversity over several independent channels as in the single source-destination (no relay) case. The details of a decode-remodulate-forward scheme are developed in the following sections. The preferred second embodiment uses a pre-determined spreading rotation matrix to remodulate at the relay nodes by having each relay node use a different row such that no two relays use the same row.

Consider QAM-based modulation, which is commonly used in wireless communication systems. In a preferred embodiment for four bits $b_0 b_1 b_2 b_3$ at the source, it is desired to modulate them into 16-QAM symbols. Typically, non-cooperative communication systems use the following Gray-mapping:

$$x = [2 \quad -1 \quad 2i \quad -i] \cdot \begin{bmatrix} 2b_0 - 1 \\ 2b_1 - 1 \\ 2b_2 - 1 \\ 2b_3 - 1 \end{bmatrix} \text{ where } x \text{ is a 16-QAM symbol.}$$

For the case of cooperative communication systems having one relay, if these four bits are decoded correctly at a relay node, the above mapping is not necessary for the relay to retransmit the forwarded symbol. In a preferred embodiment, the following mapping is used instead:

$$\begin{bmatrix} x_s \\ x_r \end{bmatrix} = \begin{bmatrix} 2 & -1 & 2i & -i \\ 1 & 2 & i & 2i \end{bmatrix} \cdot \begin{bmatrix} 2b_0 - 1 \\ 2b_1 - 1 \\ 2b_2 - 1 \\ 2b_3 - 1 \end{bmatrix}$$

where $x_s$ is the modulated symbol for the source and $x_r$ is the modulated symbol for the relay.

Considering the signal constellation, it can be seen that the source symbol and relay symbol have different structures, which provides another kind of signal space diversity that is better than the repetition-based diversity. This is the motivation for the "decode-remodulate-and-forward" (D-ReM-F) of a second preferred embodiment, where remodulate means the relay uses different modulation than the source, in this case a row of a 'mother' spreading rotation matrix.

Similarly, in a preferred embodiment, if there are six bits $b_0 b_1 b_2 b_3 b_4 b_5$ and it is desired to map them into 64-QAM symbols at the source and the relay, the following mapping is used:

$$\begin{bmatrix} x_s \\ x_r \end{bmatrix} = \begin{bmatrix} 4 & 2 & -1 & 4i & 2i & -i \\ -1 & 4 & 2 & -i & 4i & 2i \end{bmatrix} \cdot \begin{bmatrix} 2b_0 - 1 \\ 2b_1 - 1 \\ 2b_2 - 1 \\ 2b_3 - 1 \\ 2b_4 - 1 \\ 2b_5 - 1 \end{bmatrix}$$

where $x_s$ is the modulated symbol for the source and $x_r$ is the modulated symbol for the relay. If there are two relays, one more mapping can be done by the second relay $$\begin{bmatrix} x_s \\ x_{r1} \\ x_{r2} \end{bmatrix} = \begin{bmatrix} 4 & 2 & -1 & 4i & 2i & -i \\ -1 & 4 & 2 & -i & 4i & 2i \\ 2 & -1 & 4 & 2i & -i & 4i \end{bmatrix} \cdot \begin{bmatrix} 2b_0 - 1 \\ 2b_1 - 1 \\ 2b_2 - 1 \\ 2b_3 - 1 \\ 2b_4 - 1 \\ 2b_5 - 1 \end{bmatrix}$$

where $x_s$ is the modulated symbol for the source, $x_{r1}$ is the modulated symbol for the first relay and $x_{r2}$ is the modulated symbol for the second relay.

However, for two bits with QSPK (4-QAM) transmission, because of the special signal constellation, the relay can either keep the same 4-QAM as the source or use a different one. It doesn't change the overall system performance.

$$\begin{bmatrix} x_s \\ x_r \end{bmatrix} = \begin{bmatrix} 1 & i \\ 1 & -i \end{bmatrix} \cdot \begin{bmatrix} 2b_0 - 1 \\ 2b_1 - 1 \end{bmatrix} \text{ or } \begin{bmatrix} x_s \\ x_r \end{bmatrix} = \begin{bmatrix} 1 & i \\ 1 & i \end{bmatrix} \cdot \begin{bmatrix} 2b_0 - 1 \\ 2b_1 - 1 \end{bmatrix}$$

where $x_s$ is the modulated symbol for the source and $x_r$ is the modulated symbol for the relay.

Figure 6:
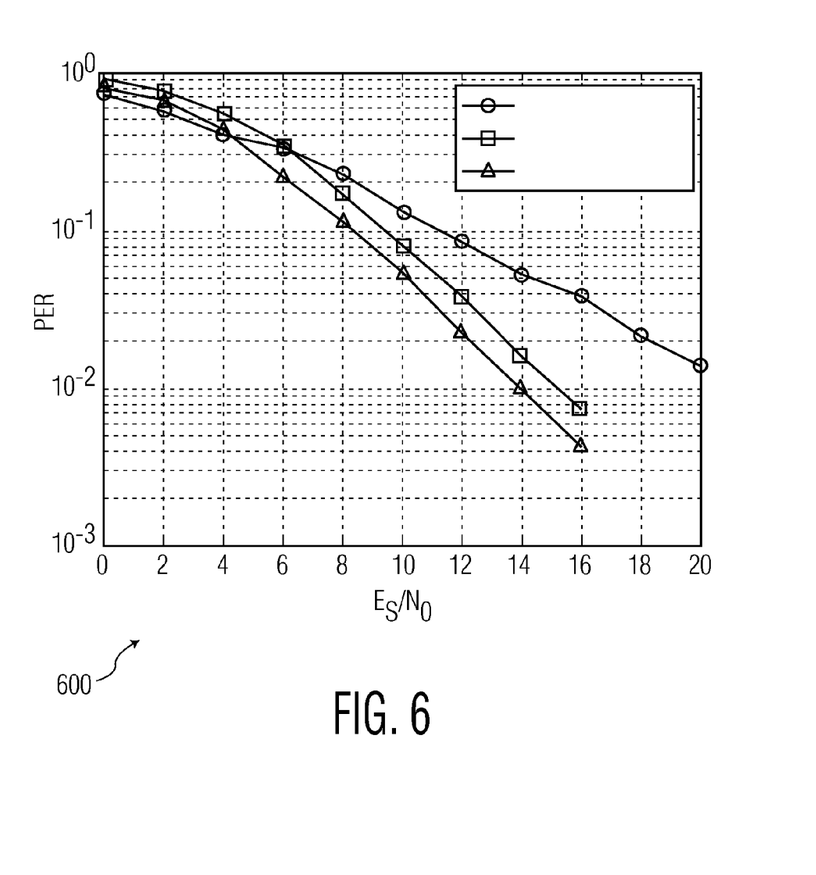
FIG. 6 illustrates the performance of prior art DMF and D-ReM-F of the present invention.

Simulation results are presented for the case of both block fading and fast fading. For the block fading case, the packet size is 130 bits, and is encoded by the (15.17) rate 1/2 convolution code and interleaved by a block interleaver. The distance between the source and relay is 0.1, the distance between the relay and destination is 0.9, and the distance between source and destination is 1. The 16-QAM performance of general repetition-based decode-forward (D-M-F) is compared with a preferred embodiment of decode-remodulate-forward (D-ReM-F) with direct QPSK transmission. It can be seen from FIG. 6 that both cooperative schemes surpass direct transmission, but the D-ReM-F has better PER performance than D-M-F, due to the modulation gain from signal space.

Figure 7:
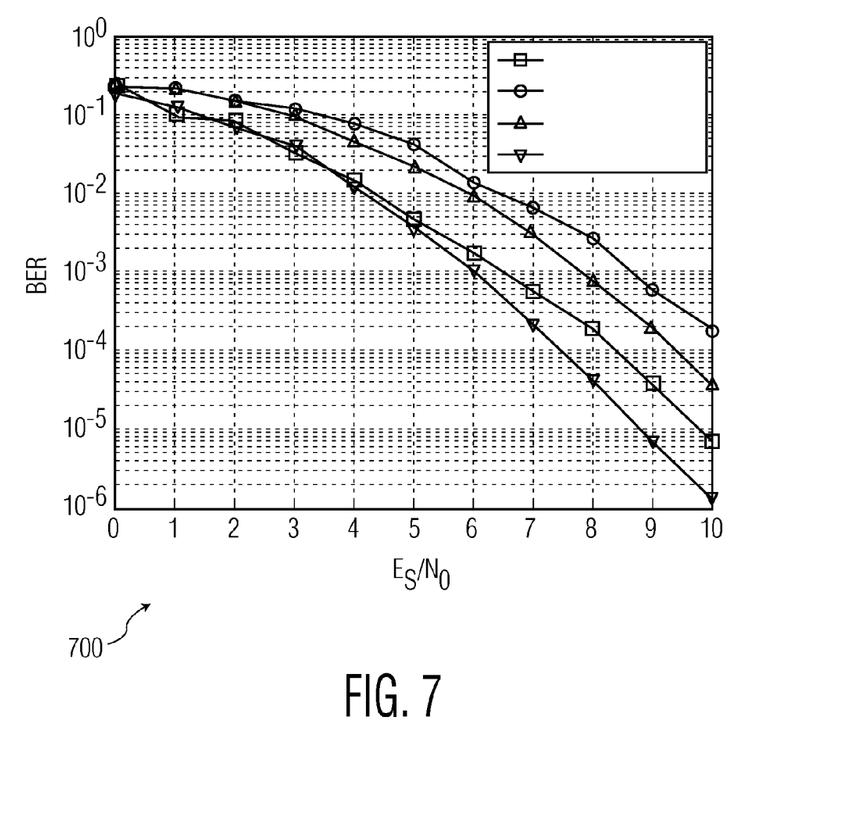
FIG. 7 illustrates that performance advantage of a D-ReM-F scheme according to the present invention.

For the fast fading case, if the inter-user channel SNR is 20 dB and they have equal distance to the destination, it can be seen from FIG. 7 that the general 16-QAM AF and repetition-based DF cannot be better than direct QPSK transmission. However, the proposed scheme (denoted by DMF in the figure) is better than direct QPSK transmission.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claim appended hereto.

We claim:

1. A system for increasing a diversity of a communication system using QAM modulation, comprising:
    a receiver device to receive and jointly decode N spread QAM symbols received over N different independent channels; and
    a transmitter device to spread and rotate N QAM symbols and then transmit the N spread and rotated QAM symbols over N different independent channels,
    wherein the transmitter device further comprises a spreading rotation component to multiply the N QAM symbols by a pre-specified N×N integer spreading rotation matrix,
    wherein, the diversity for the communication system is optimally increased while maintaining the same transmission rate, and
    wherein the pre-specified N×N integer spreading rotation matrix is the integer 2×2 integer spreading rotation matrix $$I_{16,2} = \frac{1}{\sqrt{17}} \begin{bmatrix} 4 & 1 \\ 1 & -4 \end{bmatrix}$$

which spreads 16-QAM symbols into regular 256-QAM symbols, and the 2×2 integer spreading rotation matrix that spreads 64-QAM symbols and 256-QAM symbols are $$I_{64,2} = \frac{1}{\sqrt{65}} \begin{bmatrix} 8 & 1 \\ 1 & -8 \end{bmatrix} \text{ and } I_{256,2} = \frac{1}{\sqrt{257}} \begin{bmatrix} 16 & 1 \\ 1 & -16 \end{bmatrix}$$

respectively.

2. The system of claim 1, wherein the communication system is a multi-band orthogonal frequency division multiplexing ultra wide band (MB OFDM UWB) system.

3. The system of claim 1, wherein:
    the communication system is a cooperative communication system comprising a source node S, a single relay node R, and a destination node D; and
    the 2×2 integer rotation matrix is used as a distributed modulation scheme in which a source node S multiplies a source signal by a first row of the integer rotation matrix and the relay node R receives and decodes the rotated signal and if correct, remodulates the decoded signal by multiplying the decoded signal by a second row of the integer rotation matrix and retransmits the remodulated rotated signal, and the destination node D performs joint decoding of all received signals.

4. A system for increasing a diversity of a communication system using QAM modulation, comprising:

a receiver device to receive and jointly decode N spread QAM symbols received over N different independent channels; and a transmitter device to spread and rotate N QAM symbols and then transmit the N spread and rotated QAM symbols over N different independent channels, wherein the transmitter device further comprises a spreading rotation component to multiply the N QAM symbols by a pre-specified N×N integer spreading rotation matrix, wherein, the diversity for the communication system is optimally increased while maintaining the same transmission rate; and wherein the pre-specified N×N integer spreading rotation matrix is:

the integer 3×3 rotation matrix selected from the group of matrices consisting of $$I_{4,3} = \frac{1}{\sqrt{21}} \begin{bmatrix} 4 & 2 & -1 \\ -1 & 4 & 2 \\ 2 & 1 & 4 \end{bmatrix}, \frac{1}{\sqrt{21}} \begin{bmatrix} 4 & -2 & 1 \\ 1 & 4 & -2 \\ 2 & 1 & 4 \end{bmatrix}$$

and any permutation of these two matrices between rows or columns, which spread 4-QAM symbols into regular 64-QAM symbols, and the 3×3 integer spreading rotation matrices that can spread 16-QAM symbols, 64-QAM symbols and three 256-QAM symbols are, respectively selected from the respective group consisting of:

$$I_{16,3} = \frac{1}{\sqrt{273}} \begin{bmatrix} 16 & 4 & -1 \\ -1 & 16 & 4 \\ 4 & -1 & 16 \end{bmatrix}, \frac{1}{\sqrt{273}} \begin{bmatrix} 16 & -4 & 1 \\ 1 & 16 & -4 \\ -4 & 1 & 16 \end{bmatrix}$$

$$I_{64,3} = \frac{1}{\sqrt{4161}} \begin{bmatrix} 64 & 8 & -1 \\ -1 & 64 & 8 \\ 8 & -1 & 64 \end{bmatrix}, \frac{1}{\sqrt{4161}} \begin{bmatrix} 64 & -8 & 1 \\ 1 & 64 & -8 \\ -8 & 1 & 64 \end{bmatrix}$$

$$I_{256,3} = \frac{1}{\sqrt{65793}} \begin{bmatrix} 256 & 16 & -1 \\ -1 & 256 & 16 \\ 16 & -1 & 256 \end{bmatrix}, \frac{1}{\sqrt{65793}} \begin{bmatrix} 256 & -16 & 1 \\ 1 & 256 & -16 \\ -16 & 1 & 256 \end{bmatrix}$$

and any permutation of each above matrix between rows or columns.

5. The system of claim 4, wherein:

the communication system is a cooperative communication system comprising a source node S, two relay nodes $R_i$, and a destination node D; and the 3×3 integer rotation matrix is used as a distributed modulation scheme in which a source node S multiplies a source signal by a first row of the integer rotation matrix, the relay nodes $R_i$ receive and decode the rotated signal and if correct, each remodulates the decoded signal by multiplying the decoded signal by a row of the 3×3 integer rotation matrix different for each of the relay nodes and source node, and each relay node retransmits the remodulated rotated signal, and the destination node D performs joint decoding of all received signals.

6. A system for increasing a diversity of a communication system using QAM modulation, comprising:

a receiver device to receive and jointly decode N spread QAM symbols received over N different independent channels; and a transmitter device to spread and rotate N QAM symbols and then transmit the N spread and rotated QAM symbols over N different independent channels, wherein the transmitter device further comprises a spreading rotation component to multiply the N QAM symbols by a pre-specified N×N integer spreading rotation matrix, wherein, the diversity for the communication system is optimally increased while maintaining the same transmission rate; and wherein the N×N integer spreading rotation matrix is:

a 4×4 integer spreading matrix such that all 4×4 integer rotation matrices for four QAM symbols are of the type $$I_{4,4} = \frac{1}{\sqrt{85}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 2, \pm 4, \pm 8\}$ and their absolute value must be different from each other, and all 4×4 integer rotation matrices for 16-QAM symbols are of the type $$I_{16,4} = \frac{1}{\sqrt{4369}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 4, \pm 16, \pm 64\}$ and their absolute value must be different from each other, and all 4×4 integer rotation matrices for 64-QAM symbols are of the type $$I_{64,4} = \frac{1}{\sqrt{266305}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 8, \pm 64, \pm 512\}$ and their absolute value must be different from each other, and all 4×4 integer rotation matrices for 256-QAM symbols are of the type $$I_{256,4} = \frac{1}{\sqrt{16843009}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 16, \pm 256, \pm 4096\}$ and their absolute value must be different from each other.

7. The system of claim 6, wherein the 4×4 rotation matrix is an integer matrix given by $$I_{4,4} = \frac{1}{\sqrt{85}} \begin{bmatrix} 8 & 4 & 2 & 1 \\ -4 & 8 & -1 & 2 \\ -2 & 1 & 8 & -4 \\ -1 & -2 & 4 & 8 \end{bmatrix}$$

which spreads 4-QAM symbols into regular 256-QAM symbols.

8. The system of claim 7, wherein:
the communication system is a cooperative communication system comprising a source node S, three relay nodes $R_i$, and a destination node D; and
the 4×4 integer rotation matrix is used as a distributed modulation scheme in which a source node S multiplies a source signal by a first row of the integer rotation matrix, the relay nodes $R_i$ receive and decode the rotated signal and if correct, each remodulates the decoded signal by multiplying the decoded signal by a row of the 4×4 integer rotation matrix different for each of the relay nodes and source node, and each relay node retransmits the remodulated rotated signal, and the destination node D performs joint decoding of all received signals.

9. The system of claim 6, wherein:
the communication system is a cooperative communication system comprising a source node S, three relay nodes $R_i$, and a destination node D; and
the 4×4 integer rotation matrix is used as a distributed modulation scheme in which a source node S multiplies a source signal by a first row of the integer rotation matrix, the relay nodes $R_i$ receive and decode the rotated signal and if correct, each remodulates the decoded signal by multiplying the decoded signal by a row of the 4×4 integer rotation matrix different for each of the relay nodes and source node, and each relay node retransmits the remodulated rotated signal, and the destination node D performs joint decoding of all received signals.

10. A method for increasing a diversity of a communication system using QAM modulation, comprising the steps of:
spreading and rotating N QAM symbols by multiplication of each symbol by a pre-specified N×N spreading rotation matrix R; and
transmitting the N spread and rotated symbols over N different independent channels,
wherein the multiplication of the N QAM symbols is performed by a pre-specified N×N integer spreading rotation matrix,
wherein the diversity for the communication system is optimally increased while maintaining the same transmission rate; and
wherein, for a 2×2 matrix R for 16-QAM symbols, the 2×2 integer rotation matrix is $$I_{16,2} = \frac{1}{\sqrt{17}} \begin{bmatrix} 4 & 1 \\ 1 & -4 \end{bmatrix}$$

which spreads 16-QAM symbols into regular 256-QAM symbols, and
the 2×2 integer spreading rotation matrix that spreads 64-QAM symbols and 256-QAM symbols are $$I_{64,2} = \frac{1}{\sqrt{65}} \begin{bmatrix} 8 & 1 \\ 1 & -8 \end{bmatrix} \text{ and } I_{256,2} = \frac{1}{\sqrt{257}} \begin{bmatrix} 16 & 1 \\ 1 & -16 \end{bmatrix} \text{ respectively.}$$

11. The method of claim 10, wherein:
the communication system further configures as a cooperative communication system comprising a source node S, a single relay node R, and a destination node D; and
further comprising the step of using the 2×2 integer rotation matrix as a distributed modulation scheme in which a source node S multiplies a source signal by a first row of the integer rotation matrix and the relay node R receives and decodes the rotated signal and if correct, remodulates the decoded signal by multiplying the decoded signal by a second row of the integer rotation matrix and retransmits the remodulated rotated signal, and the destination node D performs joint decoding of all received signals.

12. A method for increasing a diversity of a communication system using QAM modulation, comprising the steps of:
spreading and rotating N QAM symbols by multiplication of each symbol by a pre-specified N×N spreading rotation matrix R; and
transmitting the N spread and rotated symbols over N different independent channels,
wherein the multiplication of the N QAM symbols is performed by a pre-specified N×N integer spreading rotation matrix,
wherein the diversity for the communication system is optimally increased while maintaining the same transmission rate; and
wherein for a 3×3 matrix R for 4-QAM symbols:
the 3×3 integer rotation matrix is selected from the group of matrices consisting of $$I_{4,3} = \frac{1}{\sqrt{21}} \begin{bmatrix} 4 & 2 & -1 \\ -1 & 4 & 2 \\ 2 & -1 & 4 \end{bmatrix}, \frac{1}{\sqrt{21}} \begin{bmatrix} 4 & -2 & 1 \\ 1 & 4 & -2 \\ -2 & 1 & 4 \end{bmatrix}$$

and any permutation of these two matrices between rows or columns, which spread 4-QAM symbols into regular 64-QAM symbols, and
the 3×3 integer spreading rotation matrix that spreads 16-QAM symbols, 64-QAM symbols and three 256-QAM symbols are respectively $$I_{16,3} = \frac{1}{\sqrt{273}} \begin{bmatrix} 16 & 4 & -1 \\ -1 & 16 & 4 \\ 4 & -1 & 16 \end{bmatrix}, \frac{1}{\sqrt{273}} \begin{bmatrix} 16 & -4 & 1 \\ 1 & 16 & -4 \\ -4 & 1 & 16 \end{bmatrix}$$

$$I_{64,3} = \frac{1}{\sqrt{4161}} \begin{bmatrix} 64 & 8 & -1 \\ -1 & 64 & 8 \\ 8 & -1 & 64 \end{bmatrix}, \frac{1}{\sqrt{4161}} \begin{bmatrix} 64 & -8 & 1 \\ 1 & 64 & -8 \\ -8 & 1 & 64 \end{bmatrix}$$

$$I_{256,3} = \frac{1}{\sqrt{65793}} \begin{bmatrix} 256 & 16 & -1 \\ -1 & 256 & 16 \\ 16 & -1 & 256 \end{bmatrix}, \frac{1}{\sqrt{65793}} \begin{bmatrix} 256 & -16 & 1 \\ 1 & 256 & -16 \\ -16 & 1 & 256 \end{bmatrix}$$

and any permutation of each above matrix between rows or columns.

13. The method of claim 12, wherein:
the communication system further configured as a cooperative communication system comprising a source node S, two relay nodes $R_i$, and a destination node D; and
further comprising the step of using the 3×3 integer rotation matrix as a distributed modulation scheme in which a source node S multiplies a source signal by a first row of the integer rotation matrix, the relay nodes $R_i$ receive and decode the rotated signal and if correct, each remodulates the decoded signal by multiplying the decoded signal by a row of the 3×3 integer rotation matrix different for each of the relay nodes and source node, and each relay node retransmits the remodulated rotated signal, and the destination node D performs joint decoding of all received signals.

14. A method for increasing a diversity of a communication system using QAM modulation, comprising the steps of:
spreading and rotating N QAM symbols by multiplication of each symbol by a pre-specified N×N spreading rotation matrix R; and
transmitting the N spread and rotated symbols over N different independent channels,
wherein the multiplication of the N QAM symbols is performed by a pre-specified N×N integer spreading rotation matrix,
wherein the diversity for the communication system is optimally increased while maintaining the same transmission rate; and
wherein for a 4×4 matrix R for QAM symbols, the matrix R is
all 4×4 integer rotation matrices for four QAM symbols are of the type $$I_{4,4} = \frac{1}{\sqrt{85}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 2, \pm 4, \pm 8\}$ and their absolute value must be different from each other, and
all 4×4 integer rotation matrices for 16-QAM symbols are of the type $$I_{16,4} = \frac{1}{\sqrt{4369}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 4, \pm 16, \pm 64\}$ and their absolute value must be different from each other, and
all 4×4 integer rotation matrices for 64-QAM symbols are of the type $$I_{64,4} = \frac{1}{\sqrt{266305}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 8, \pm 64, \pm 512\}$ and their absolute value must be different from each other, and all 4×4 integer rotation matrices for 256-QAM symbols are of the type $$I_{256,4} = \frac{1}{\sqrt{16843009}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 16, \pm 256, \pm 4096\}$ and their absolute value must be different from each other.

15. The method of claim 14, wherein:
the communication system is further configured as a cooperative communication system comprising a source node S, three relay nodes $R_i$, and a destination node D; and
further comprising the step of using the 4×4 integer rotation matrix as a distributed modulation scheme in which a source node S multiplies a source signal by a first row of the integer rotation matrix, the relay nodes $R_i$ receive and decode the rotated signal and if correct, each remodulates the decoded signal by multiplying the decoded signal by a row of the 4×4 integer rotation matrix different for each of the relay nodes and source node, and each relay node retransmits the remodulated rotated signal, and the destination node D performs joint decoding of all received signals.

16. A transmitter for increasing a diversity of a communication system using QAM modulation, comprising:
a spreader to spread and rotate N QAM symbols; and
an allocation component to allocate the N spread and rotated QAM symbols over N different independent channels for transmission thereover,
wherein the spreader is further configured to multiply the N QAM symbols by a pre-specified N×N integer spreading rotation matrix,
wherein, the diversity for the communication system is optimally increased while maintaining the same transmission rate; and
wherein the pre-specified N×N integer spreading rotation matrix is:
the 2×2 rotation matrix is $$I_{16,2} = \frac{1}{\sqrt{17}} \begin{bmatrix} 4 & 1 \\ 1 & -4 \end{bmatrix}$$

which spreads 16-QAM symbols into regular 256-QAM symbols, and
the 2×2 integer spreading rotation matrices that can spread 64-QAM symbols and 256-QAM symbols $$I_{64,2} = \frac{1}{\sqrt{65}} \begin{bmatrix} 8 & 1 \\ 1 & -8 \end{bmatrix} \text{ and } I_{256,2} = \frac{1}{\sqrt{257}} \begin{bmatrix} 16 & 1 \\ 1 & -16 \end{bmatrix} \text{ respectively.}$$

17. The transmitter of claim 16, wherein the communication system is a multi-band orthogonal frequency division multiplexing ultra wide band (MB OFDM UWB) system.

18. The transmitter of claim 16, wherein:
the communication system is a cooperative communication system comprising a source node S, a single relay node R, and a destination node D; and the 2×2 integer rotation matrix is used as a distributed modulation scheme in which a source node S multiplies a source signal by a first row of the integer rotation matrix and the relay node R receives and decodes the rotated signal and if correct, remodulates the decoded signal by multiplying the decoded signal by a second row of the integer rotation matrix and retransmits the remodulated rotated signal, and the destination node D performs joint decoding of all received signals.

19. A transmitter for increasing a diversity of a communication system using QAM modulation, comprising:
a spreader to spread and rotate N QAM symbols; and
an allocation component to allocate the N spread and rotated QAM symbols over N different independent channels for transmission thereover,
wherein the spreader is further configured to multiply the N QAM symbols by a pre-specified N×N integer spreading rotation matrix,
wherein, the diversity for the communication system is optimally increased while maintaining the same transmission rate; and
wherein the pre-specified N×N integer spreading rotation matrix is:
a 3×3 integer spreading rotation matrix selected from the group of matrices consisting of $$I_{4,3} = \frac{1}{\sqrt{21}} \begin{bmatrix} 4 & 2 & -1 \\ -1 & 4 & 2 \\ 2 & -1 & 4 \end{bmatrix}, \frac{1}{\sqrt{21}} \begin{bmatrix} 4 & -2 & 1 \\ 1 & 4 & -2 \\ -2 & 1 & 4 \end{bmatrix}$$

and any permutation of these two matrices between rows or columns, which spread 4-QAM symbols into regular 64-QAM symbols, and
a 3×3 integer spreading rotation matrix that spreads 16-QAM symbols, 64-QAM symbols and three 256-QAM symbols respectively selected from the respective group consisting of $$I_{16,3} = \frac{1}{\sqrt{273}} \begin{bmatrix} 16 & 4 & -1 \\ -1 & 16 & 4 \\ 4 & -1 & 16 \end{bmatrix}, \frac{1}{\sqrt{273}} \begin{bmatrix} 16 & -4 & 1 \\ 1 & 16 & -4 \\ -4 & 1 & 16 \end{bmatrix}$$

$$I_{64,3} = \frac{1}{\sqrt{4161}} \begin{bmatrix} 64 & 8 & -1 \\ -1 & 64 & 8 \\ 8 & -1 & 64 \end{bmatrix}, \frac{1}{\sqrt{4161}} \begin{bmatrix} 64 & -8 & 1 \\ 1 & 64 & -8 \\ -8 & 1 & 64 \end{bmatrix}$$

$$I_{256,3} = \frac{1}{\sqrt{65793}} \begin{bmatrix} 256 & 16 & -1 \\ -1 & 256 & 16 \\ 16 & -1 & 256 \end{bmatrix}, \frac{1}{\sqrt{65793}} \begin{bmatrix} 256 & -16 & 1 \\ 1 & 256 & -16 \\ -16 & 1 & 256 \end{bmatrix}$$

and any permutation of each above matrix between rows or columns.

20. The transmitter of claim 19, wherein:
the communication system is a cooperative communication system comprising a source node S, two relay nodes $R_i$, and a destination node D; and
the 3×3 integer rotation matrix is used as a distributed modulation scheme in which a source node S multiplies a source signal by a first row of the integer rotation matrix, the relay nodes $R_i$ receive and decode the rotated signal and if correct, each remodulates the decoded signal by multiplying the decoded signal by a row of the 3×3 integer rotation matrix different for each of the relay nodes and source node, and each relay node retransmits the remodulated rotated signal, and the destination node D performs joint decoding of all received signals.

21. A transmitter for increasing a diversity of a communication system using QAM modulation, comprising:
a spreader to spread and rotate N QAM symbols; and
an allocation component to allocate the N spread and rotated QAM symbols over N different independent channels for transmission thereover,
wherein the spreader is further configured to multiply the N QAM symbols by a pre-specified N×N integer spreading rotation matrix,
wherein, the diversity for the communication system is optimally increased while maintaining the same transmission rate; and
wherein the pre-specified N×N integer spreading rotation matrix is:
all 4×4 integer rotation matrices for 4-QAM symbols of the type $$I_{4,4} = \frac{1}{\sqrt{85}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 2, \pm 4, \pm 8\}$ and their absolute value must be different from each other, and
all 4×4 integer rotation matrices for 16-QAM symbols of the type $$I_{16,4} = \frac{1}{\sqrt{4369}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 4, \pm 16, \pm 64\}$ and their absolute value must be different from each other, and
all 4×4 integer rotation matrices for 64-QAM symbols of the type $$I_{64,4} = \frac{1}{\sqrt{266305}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 8, \pm 64, \pm 512\}$ and their absolute value must be different from each other, and
all 4×4 integer rotation matrices for 256-QAM symbols of the type:

$$I_{256,4} = \frac{1}{\sqrt{16843009}} \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

where $x_1, x_2, x_3, x_4 \in \{\pm 1, \pm 16, \pm 256, \pm 4096\}$ and their absolute value must be different from each other.

22. The transmitter of claim 21, wherein:
the communication system is a cooperative communication system comprising a source node S, three relay nodes $R_i$, and a destination node D; and
the 4×4 integer rotation matrix is used as a distributed modulation scheme in which a source node S multiplies a source signal by a first row of the integer rotation matrix, the relay nodes $R_i$ receive and decode the rotated signal and if correct, each remodulates the decoded signal by multiplying the decoded signal by a row of the 4×4 integer rotation matrix different for each of the relay nodes and source node, and each relay node retransmits the remodulated rotated signal, and the destination node D performs joint decoding of all received signals.

23. A transmitter for increasing a diversity of a communication system using QAM modulation, comprising:
a spreader to spread and rotate N QAM symbols; and
an allocation component to allocate the N spread and rotated QAM symbols over N different independent channels for transmission thereover,
wherein the spreader is further configured to multiply the N QAM symbols by a pre-specified N×N integer spreading rotation matrix,
wherein, the diversity for the communication system is optimally increased while maintaining the same transmission rate; and
wherein the pre-specified N×N integer spreading rotation matrix is the 4×4 rotation matrix is an integer matrix given by $$I_{4,4} = \frac{1}{\sqrt{85}} \begin{bmatrix} 8 & 4 & 2 & 1 \\ -4 & 8 & -1 & 2 \\ -2 & 1 & 8 & -4 \\ -1 & -2 & 4 & 8 \end{bmatrix}$$

which spreads 4-QAM symbols into regular 256-QAM symbols.

24. The transmitter of claim 23, wherein:
the communication system is a cooperative communication system comprising a source node S, three relay nodes $R_i$, and a destination node D; and
the 4×4 integer rotation matrix is used as a distributed modulation scheme in which a source node S multiplies a source signal by a first row of the integer rotation matrix, the relay nodes $R_i$ receive and decode the rotated signal and if correct, each remodulates the decoded signal by multiplying the decoded signal by a row of the 4×4 integer rotation matrix different for each of the relay nodes and source node, and each relay node retransmits the remodulated rotated signal, and the destination node D performs joint decoding of all received signals.

* * * * *